United States Patent
Lee et al.

(10) Patent No.: US 12,204,238 B2
(45) Date of Patent: Jan. 21, 2025

(54) CAMERA LENS ASSEMBLY

(71) Applicant: SAMYANG OPTICS CO., LTD, Changwon-si (KR)

(72) Inventors: Ji Hoon Lee, Gunpo-si (KR); Han Jea Lee, Changwon-si (KR); Tae Sung Kim, Changwon-si (KR)

(73) Assignee: SAMYANG OPTICS CO., LTD, Changwon-si (KR)

( * ) Notice: Subject to any disclaimer, the term of this patent is extended or adjusted under 35 U.S.C. 154(b) by 68 days.

(21) Appl. No.: 18/175,897

(22) Filed: Feb. 28, 2023

(65) Prior Publication Data
US 2024/0176208 A1    May 30, 2024

(30) Foreign Application Priority Data
Nov. 30, 2022    (KR) .................. 10-2022-0164343

(51) Int. Cl.
*G03B 3/10*    (2021.01)
*G03B 17/12*    (2021.01)
*G03B 17/18*    (2021.01)
(52) U.S. Cl.
CPC ............... *G03B 3/10* (2013.01); *G03B 17/12* (2013.01); *G03B 17/18* (2013.01)
(58) Field of Classification Search
None
See application file for complete search history.

(56) References Cited

U.S. PATENT DOCUMENTS

| 8,682,152 B2 | 3/2014 | Kishida |
| 8,899,850 B2 * | 12/2014 | Kaye .................. G03B 11/041 396/448 |
| 10,054,761 B2 | 8/2018 | Macintosh et al. |

(Continued)

FOREIGN PATENT DOCUMENTS

| EP | 3 410 201 A1 | 12/2018 |
| JP | 2002-014389 A | 1/2002 |

(Continued)

OTHER PUBLICATIONS

The partial European search report (R. 64 EPC) issued by the European Patent Office on Aug. 22, 2023, which corresponds to European Patent Application No. 23150177.6-1020 and is related to U.S. Appl. No. 18/175,897.

*Primary Examiner* — Clayton E. LaBalle
*Assistant Examiner* — Diana Hancock
(74) *Attorney, Agent, or Firm* — Studebaker & Brackett PC

(57) ABSTRACT

A camera lens assembly includes a plurality of optical lenses accommodated in the camera lens assembly, a first lens mount for detachably mounting the camera lens assembly to the camera body, a first electric connector formed on a rear face of the camera lens assembly. The first electric connector is electrically coupled to the camera body when the camera lens assembly is mounted on the camera body, a lens communication unit connected to the first electric connector so as to transmit and receive an electrical signal between the camera lens assembly and the camera body, a lens driver for controlling a displacement of each of the plurality of optical lenses based on the electrical signal received from the camera body, and an indicator for visually presenting an imaging state of the camera body, based on the received electrical signal.

8 Claims, 12 Drawing Sheets

(56) References Cited

U.S. PATENT DOCUMENTS

| | | | |
|---|---|---|---|
| 10,502,927 B2 | 12/2019 | Macintosh et al. | |
| 10,627,704 B2 * | 4/2020 | Tamura | G03B 17/14 |
| 11,126,067 B2 | 9/2021 | Tamura et al. | |
| 2005/0168624 A1 | 8/2005 | Hasegawa | |
| 2006/0067679 A1 * | 3/2006 | Suzuki | G03B 17/14 |
| | | | 396/531 |
| 2012/0114319 A1 * | 5/2012 | Kishida | G03B 17/14 |
| | | | 359/811 |
| 2020/0292782 A1 * | 9/2020 | Macintosh | G02B 7/102 |
| 2021/0239936 A1 * | 8/2021 | Shirono | G03B 17/18 |
| 2024/0053662 A1 * | 2/2024 | Stern | G02B 3/04 |
| 2024/0142742 A1 * | 5/2024 | Platner | G03B 17/12 |

FOREIGN PATENT DOCUMENTS

| | | |
|---|---|---|
| KR | 10-2090965 B1 | 3/2020 |
| WO | 2016/094842 A1 | 6/2016 |

* cited by examiner

CAMERA LENS ASSEMBLY

CROSS-REFERENCE TO RELATED APPLICATION

This application claims priority from Korean Patent Application No. 10-2022-0164343 filed on Nov. 30, 2022, in the Korean Intellectual Property Office, and all the benefits accruing therefrom under 35 U.S.C. 119, the contents of which in its entirety are herein incorporated by reference.

BACKGROUND

Field

The present disclosure relates to a camera lens assembly detachable from a camera body, and more particularly, to a camera lens assembly capable of communicating with the camera body and controlling movement of a plurality of optical lenses by itself.

Description of Related Art

In general, a camera accessory detachable from a camera body receives power from the camera body while being attached to the camera body, or communicates various commands or data with the camera body. An element that physically mounts the camera accessory in a detachable manner to the camera body for the power supply or communication as described above is called a mount. When the camera accessory is mounted in a detachable manner to the camera body using the mount, a plurality of terminals installed near the mount contact each other and thus are electrically connected to each other.

A representative example of the camera accessory is a camera lens assembly. The camera lens assembly has a lens driver, a processor, and a communication unit to perform zooming and focusing functions by itself, and is a kind of an independently manufactured/sold electro-optical device.

However, in imaging an imaging target person by the camera body equipped with such a camera lens assembly, it is difficult for the imaging target person to intuitively check an imaging status of the camera. Thus, the imaging target person should receive a current imaging status via a separate path. This is inconvenient. This is the result of not fully utilizing advantages of the camera lens assembly as the electro-optical device.

Further, conventionally, in performing follow focus imaging using the camera lens assembly, a separate coupling adapter should be installed on an outer face of a manual ring of the camera lens assembly for coupling with a driving gear. This is inconvenient.

These problems may be more prominent in an advertisement image creation job that creates a large number of still images or in production of a movie or broadcasting program that images a moving picture for a long time.

SUMMARY

A technical purpose to be achieved by the present disclosure is to provide a camera lens assembly that allows an imaging target person to intuitively check an imaging state of a camera.

Another technical purpose to be achieved by the present disclosure is to provide a camera lens assembly compatible with a driving gear of a follow focus device without a separate coupling adapter.

Purposes according to the present disclosure are not limited to the above-mentioned purpose. Other purposes and advantages according to the present disclosure that are not mentioned may be understood based on following descriptions, and may be more clearly understood based on embodiments according to the present disclosure. Further, it will be easily understood that the purposes and advantages according to the present disclosure may be realized using means shown in the claims and combinations thereof.

According to an aspect of an exemplary embodiment, there is provided a camera lens assembly capable of communicating with a camera body and having a processor and a memory disposed therein, and the camera lens assembly includes: a plurality of optical lenses accommodated in the camera lens assembly; a first lens mount for detachably mounting the camera lens assembly to the camera body; a first electric connector formed on a rear face of the camera lens assembly, wherein the first electric connector is electrically coupled to the camera body when the camera lens assembly is mounted on the camera body; a lens communication unit connected to the first electric connector so as to transmit and receive an electrical signal between the camera lens assembly and the camera body; a lens driver for controlling a displacement of each of the plurality of optical lenses based on the electrical signal received from the camera body; and an indicator for visually presenting an imaging state of the camera body, based on the received electrical signal, wherein the indicator is installed on a front face of the camera lens assembly so that an imaging target person imaged by the camera body can visually recognize the imaging state of the camera body.

The indicator may be implemented as a figure-shaped lamp or a character-shaped lamp, wherein the imaging state indicates that the camera body is imaging the imaging target person.

The camera lens assembly may further include: a second lens mount formed on the front face of the camera lens assembly, wherein the second lens mount is configured for detachably attaching an extension adapter extending an optical function of the camera lens assembly to the camera lens assembly; and a second electric connector formed on the front face of the camera lens assembly, wherein the second electric connector is electrically coupled to the extension adapter when the extension adapter is mounted on the camera lens assembly, wherein the lens communication unit is connected to the second electric connector so as to transmit and receive an electrical signal between the extension adapter and the camera lens assembly.

The indicator and the second electric connector may be respectively positioned on opposite sides to each other of a circumferential area of the front face of the camera lens assembly.

The indicator may be positioned on an upper side of the front face of the camera lens assembly, and the second electric connector may be positioned on a lower side of the front face of the camera lens assembly.

The second lens mount may include a plurality of bayonet claws, wherein each of the indicator and the second electric connector is positioned on a portion of a circumferential area of the front face of the camera lens assembly in which the plurality of bayonet claws are absent.

The camera lens assembly may further include a switch for receiving a selected one of a plurality of functions provided by the camera lens assembly from a user, wherein the lens driver controls a displacement of at least one of the plurality of optical lenses disposed in the camera lens assembly based on a mode indicated by the switch.

The camera lens assembly may further include a second indicator installed on a barrel of the camera lens assembly so that a person manipulating the camera body can visually recognize the imaging state of the camera body via the second indicator.

According to an aspect of another exemplary embodiment, there is provided a camera lens assembly capable of communicating with a camera body and having a processor and a memory disposed therein, and the camera lens assembly includes: a plurality of optical lenses accommodated in the camera lens assembly; a lens mount detachably coupled to a camera mount formed on the camera body so as to mount the camera lens assembly on the camera body; an electric connector formed on one side of the lens mount and electrically coupled to the camera body; a lens communication unit connected to the electric connector so as to transmit and receive an electrical signal between the camera lens assembly and the camera body; a manual ring disposed on an outer face of the camera lens assembly so that a user can manipulate the manual ring in a rotational manner; and a lens driver for controlling a displacement of each of the plurality of optical lenses based on the electrical signal received from the camera body and/or a manipulation value of the manual ring, wherein a gear train is formed on an outer circumferential face of the manual ring and is configured to be directly engaged with a follow-focus gear capable of rotating the manual ring without user intervention, wherein the gear train has a predetermined gear height and a predetermined contact face width.

The gear train may include: a first gear train extending a circumferential direction and having the gear height and the contact face width; a second gear train extending in the circumferential direction and spaced apart from the first gear train in an axial direction, wherein the second gear train has the gear height and the contact face width; and a groove extending in the circumferential direction so as to space the first gear train and the second gear train from each other by a predetermined spacing.

The gear height may be in a range of 0.8 mm to 1.7 mm, and the contact face width is in a range of 0.8 mm to 1.6 mm.

A sum of the gear height and the contact face width may be in a range of 2.4 mm to 2.5 mm.

According to the camera lens assembly according to the present disclosure, the imaging target person may directly check whether the camera is imaging the same, such that efficient imaging may be performed.

Further, according to the camera lens assembly according to the present disclosure, the gear train may be formed on the outer face of the manual ring so as to directly engage with the driving gear of the follow focus device, enabling a more convenient follow focusing operation.

BRIEF DESCRIPTION OF DRAWINGS

The above and other aspects and features of the present disclosure will become more apparent by describing in detail illustrative embodiments thereof with reference to the attached drawings, in which.

DETAILED DESCRIPTIONS

Figure 1:
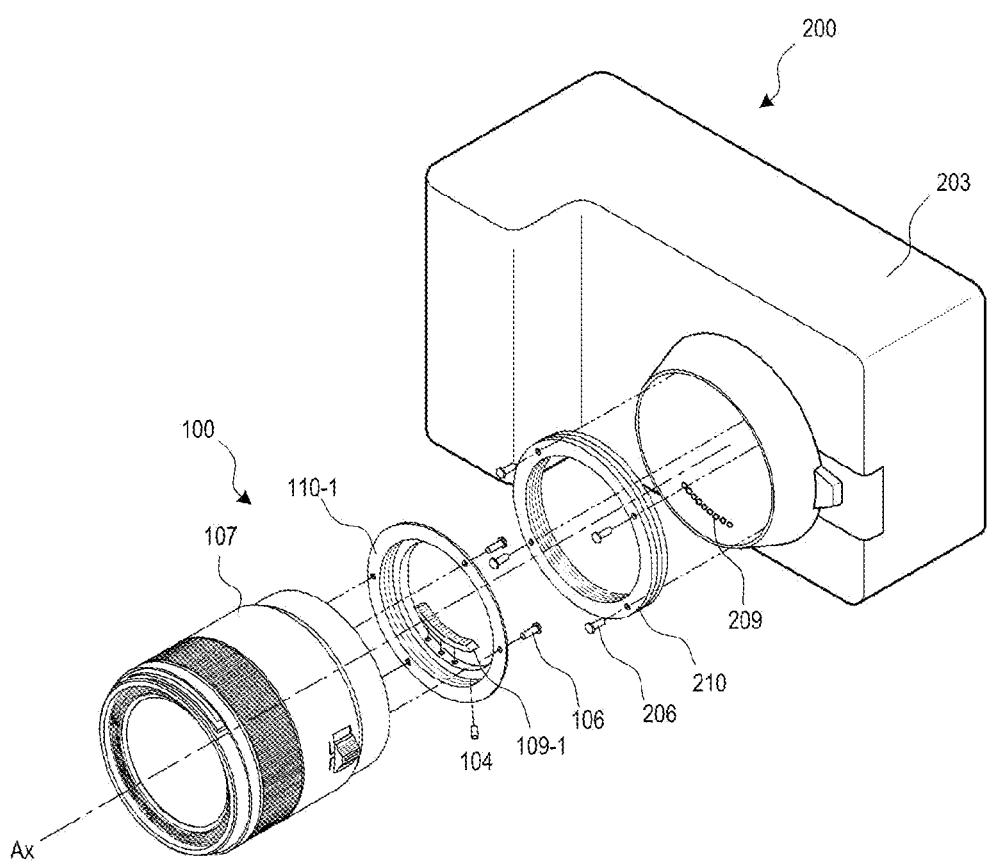
FIG. 1 is an exploded perspective view showing a camera lens assembly and a camera body according to an embodiment of the present disclosure.

Advantages and features of the disclosure and methods to achieve them will become apparent from the descriptions of exemplary embodiments herein below with reference to the accompanying drawings. However, the inventive concept is not limited to exemplary embodiments disclosed herein but may be implemented in various ways. The exemplary embodiments are provided for making the disclosure of the inventive concept thorough and for fully conveying the scope of the inventive concept to those skilled in the art. It is to be noted that the scope of the disclosure is defined only by the claims. Like reference numerals denote like elements throughout the descriptions.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Terms used herein are for illustrating the embodiments rather than limiting the present disclosure. As used herein, the singular forms are intended to include plural forms as well, unless the context clearly indicates otherwise. Throughout this specification, the word "comprise" and variations such as "comprises" or "comprising," will be understood to imply the inclusion of stated elements but not the exclusion of any other elements.

Hereinafter, exemplary embodiments of the present disclosure will be described in detail with reference to the accompanying drawings.

FIG. 1 is an exploded perspective view showing a camera lens assembly 100 and a camera body 200 according to an embodiment of the present disclosure.

An optical axis Ax is an axis representing a center of light flux from a subject facing the camera lens assembly 100. The camera lens assembly 100 and the camera body 200 may be fixed to each other via a lock pin (not shown) in a state in which contact faces of a first lens mount 110-1 and a camera mount 210 are in contact with each other.

A camera housing 203 is a housing that receives components of the camera body 200. More specifically, the camera housing 203 includes a camera mount 210, a camera electric connector 209 serving as a connector between communication units, and a camera mount fixing member 206.

The first lens mount 110-1 is fixed to a lens barrel 107 via a first lens mount fixing member 106. A first electric connector 109-1 is installed on the camera lens assembly 100 and is fixed to the first lens mount 110-1 via a fixing member 104. Therefore, when assembling the camera lens assembly 100 and the camera body 200 with each other, the first electric connector 109-1 electrically contacts the camera electric connector 209, so that the camera lens assembly 100 and the camera body 200 communicate with each other.

Figure 2A:
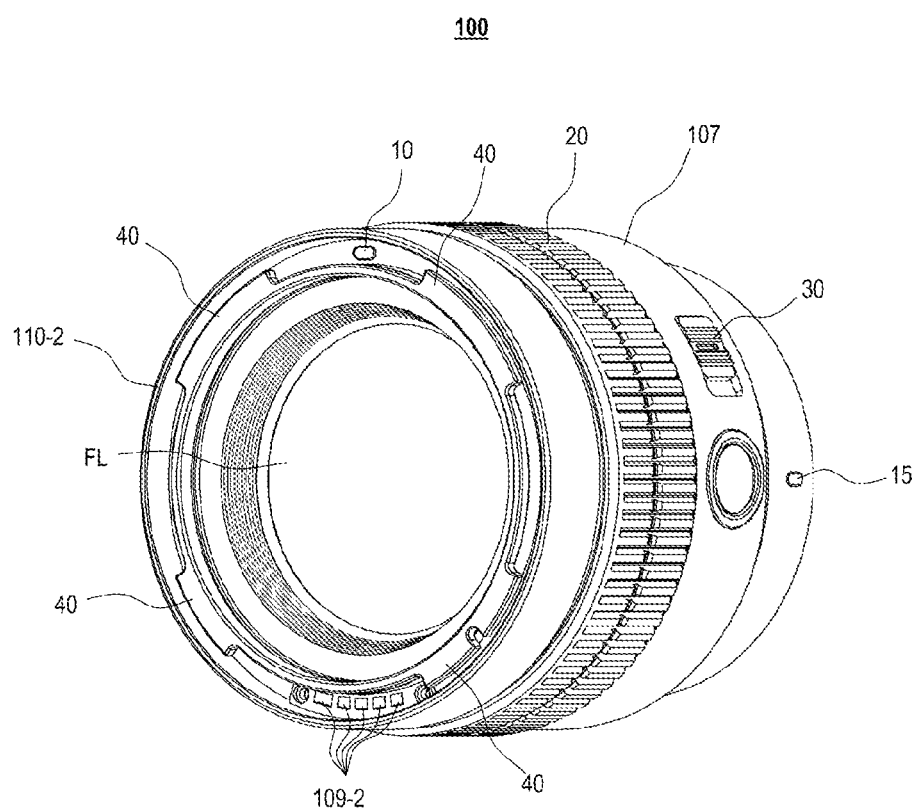
FIG. 2A is a perspective view of a camera lens assembly according to an embodiment of the present disclosure.
Figure 2B:
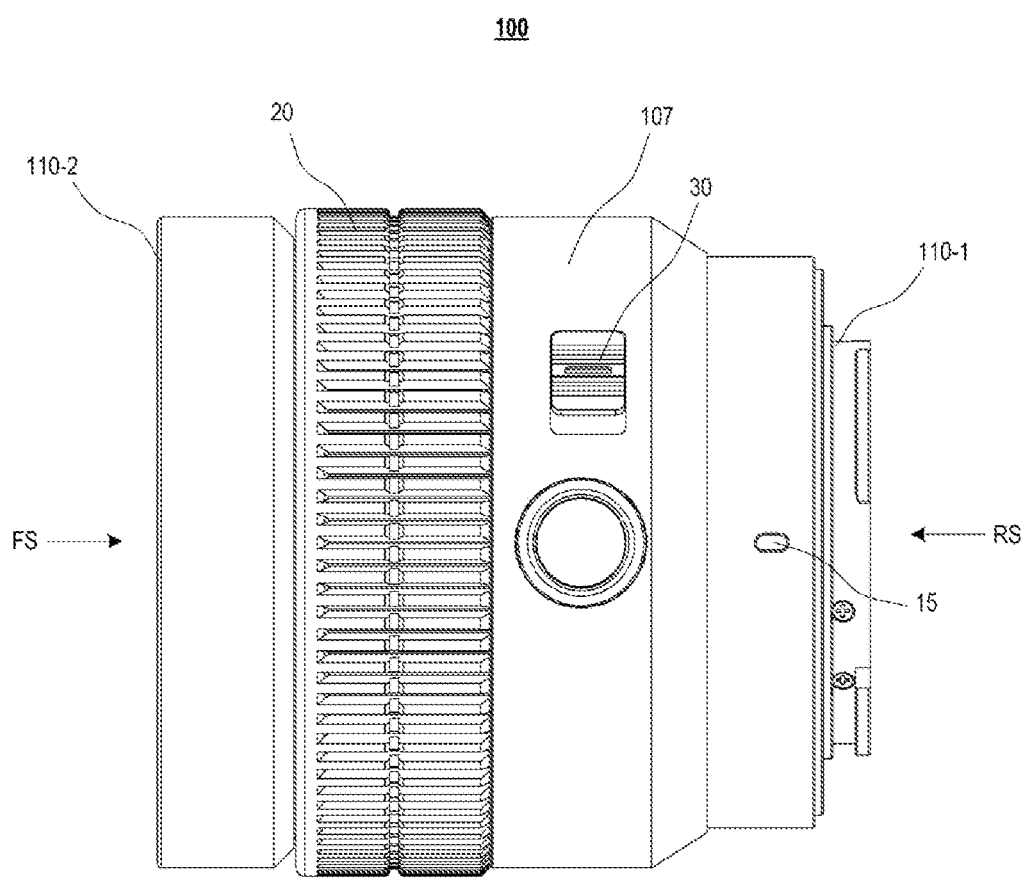
FIG. 2B is a side view of the camera lens assembly.
Figure 2C:
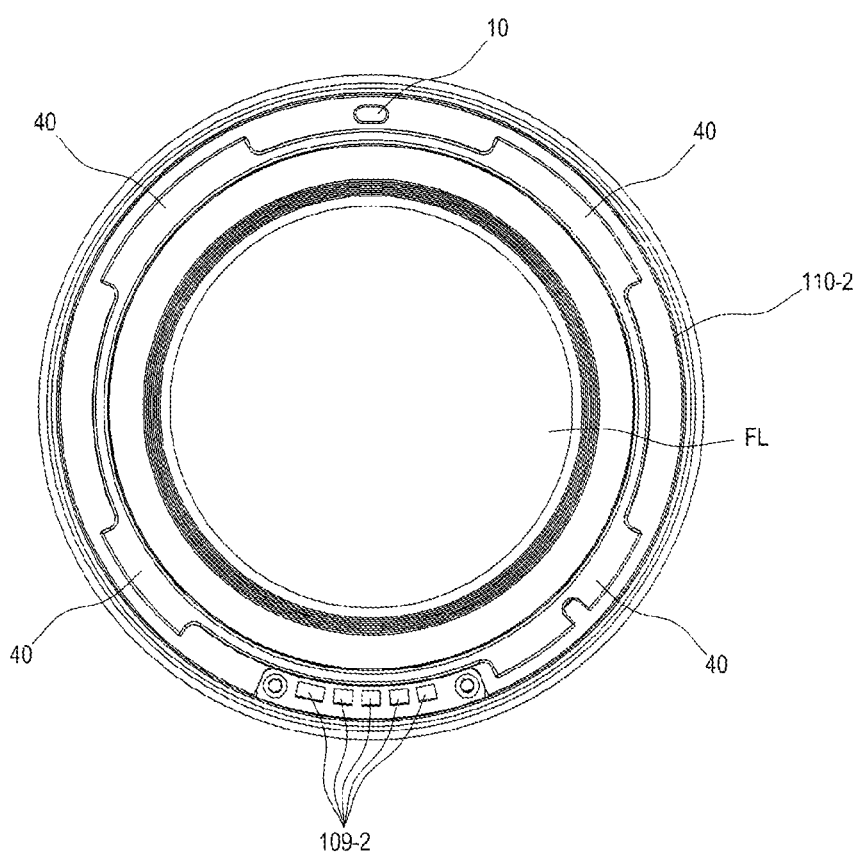
FIG. 2C is a front view of the camera lens assembly.
Figure 2D:
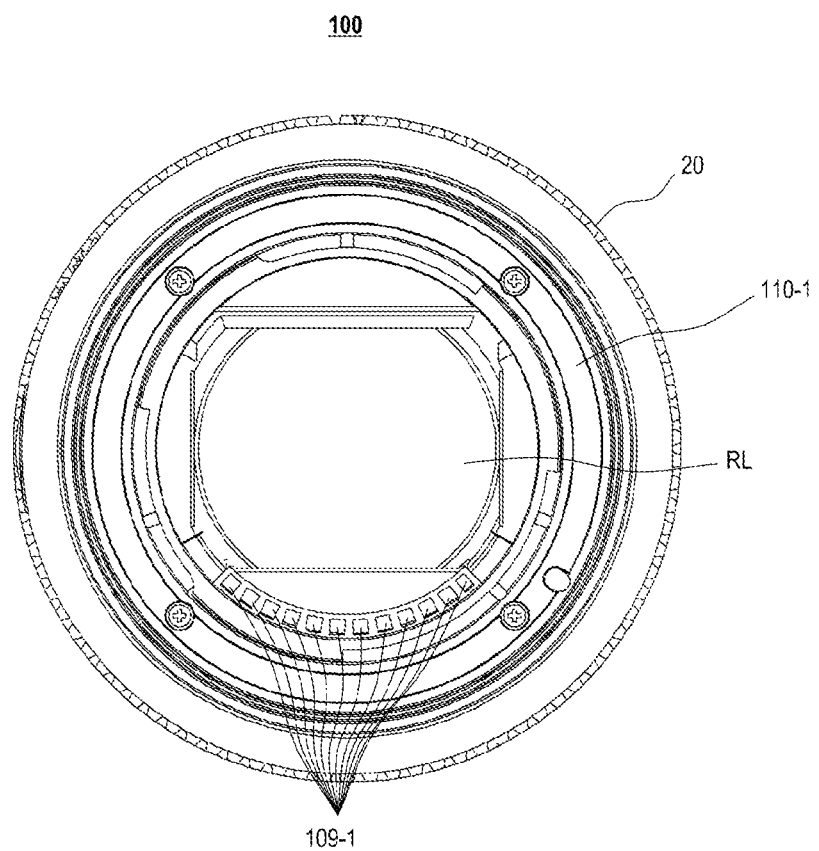
FIG. 2D is a rear view of the camera lens assembly'

FIG. 2A is a perspective view of the camera lens assembly 100 according to an embodiment of the present disclosure, FIG. 2B is a side view of the camera lens assembly 100, FIG. 2C is a front view of the camera lens assembly 100, and FIG. 2D is a rear view of the camera lens assembly 100.

As shown, the camera lens assembly 100 accommodates therein a plurality of optical lenses LU. However, in FIG. 2A and FIG. 2C, only a first lens FL closest to an object among the plurality of optical lenses LU is observed, while in FIG. 2D, only a last lens RL closest to an image among the plurality of optical lenses LU is observed. The type and the number of the optical lenses LU may vary depending on performance or an application of the camera lens assembly 100.

Further, the camera lens assembly 100 may include the first lens mount 110-1 installed on a rear face RS of the camera lens assembly 100, and may further include a second lens mount 110-2 installed on a front face FS of the camera lens assembly 100.

The first lens mount 110-1 is an element that detachably mounts the camera lens assembly 100 to the camera body 200. The second lens mount 110-2 is an element for detachably mounting an extension adapter for extending an optical function of the camera lens assembly 100 to the camera lens assembly 100. For such mounting, for example, each of the first lens mount 110-1 and/or the second lens mount 110-2 may include a plurality of bayonet claws 40.

In accordance with the present disclosure, the camera lens assembly 100 is a device mounted on the camera body 200 while accommodating therein the plurality of optical lenses. The extension adapter is additionally mounted at a front end of the camera lens assembly 100 providing basic optical functions and serves to expand the optical functions. For example, the extension adapter may be a device having a special lens such as an anamorphic lens. The anamorphic lens is a lens designed for imaging and projection of a wide screen movie, and records an image on a film mounted on a camera in a contracted manner. When the recorded image is projected, a special lens that acts in an opposite manner to the manner in which the anamorphic lens acts is mounted on a projector such that the screen may be reproduced normally.

A displacement for focusing of the anamorphic lens has a predefined function relationship with a displacement of a focusing lens among the plurality of optical lenses LU. Therefore, the displacement of the focusing lens of the camera lens assembly 100 needs to be simultaneously controlled in conjunction with the displacement of the anamorphic focusing lens of the extension adapter.

Further, the electric connector 109-1 which is electrically coupled to the camera body 200 when the camera lens assembly 100 is mounted on the camera body 200 is disposed on the rear face RS on which the first lens mount 110-1 has been installed.

Similarly, a second electric connector 109-2 which is electrically coupled to the extension adapter when the extension adapter is mounted on the camera lens assembly 100 is disposed on the front face FS on which the second lens mount 110-2 has been installed. When the extension adapter is a device having the anamorphic lens, the displacement of the anamorphic focusing lens may be determined based on a measured value of a built-in potentiometer. For example, when a user rotates a manual ring included in the extension adapter, the anamorphic focusing lens is displaced based on a rotation angle of the manual ring. At this time, the measured value (resistance value) of the potentiometer varies according to the rotation angle of the manual ring, the displacement of the focusing lens may be determined based on this measured value. The measured value of the potentiometer may be transferred to the camera lens assembly 100 via the second electric connector 109-2.

Referring to FIG. 2C and FIG. 2D, it is illustrated that the second electric connector 109-2 is composed of 5 contact terminals and the first electric connector 109-1 is composed of 12 contact terminals. However, the number of the contact terminals may vary depending on the performance or an application of the camera. However, it may be general that due to a difference between the numbers of exchanged information of the second electric connector 109-2 and the first electric connector 109-1, the number of contact terminals of the first electric connector 109-1 is greater than the number of contact terminals of the second electric connector 109-2.

For example, the first electric connector 109-1 may have a VDD terminal and a VBAT terminal for supplying power from the camera body 200 to the camera lens assembly 100, and a DGND terminal and a PGND terminal for grounding. Further, the first electric connector 109-1 may further include an LCLK terminal, a DCL terminal, a DCL2 terminal, a CS terminal, and a DCA terminal for communication between the communication units. Further, the first electric connector 109-1 may further have, as other terminals, a MIF terminal that detects that the camera lens assembly 100 is mounted on the camera body 200, and a TYPE terminal for determining a type of a camera accessory mounted on the camera body 200.

In one example, the second electric connector 109-2 may have a terminal A for transmitting a signal representing the measured value of the potentiometer (corresponding to the displacement of the anamorphic focusing lens) to the camera lens assembly 100, and a terminal B for supplying power generated in the camera body 200 or the camera lens assembly 100 to the extension adapter. In another example, when the extension adapter itself has a separate power source, this terminal B may be omitted.

Referring back to FIG. 2A, FIG. 2B, and FIG. 2C, the camera lens assembly 100 according to an embodiment of the present disclosure may have at least one or more indicators 10 and 15 for visually displaying an imaging state of the camera body 200, based on an electrical signal received from the camera body 200.

In particular, the at least one or more indicators 10 and 15 may be installed on the front face FS of the camera lens assembly 100 so that the imaging target person imaged by the camera body 200 may visually recognize the imaging state of the camera body 200. Conventionally, since an indicator indicating an imaging state (e.g., power ON, imaging in progress, standby mode, etc.) is installed on the barrel of the camera body 200 or the camera lens assembly 100, it is difficult for the imaging target person to immediately known the imaging state. Therefore, a person manipulating the camera should present the imaging state to the imaging target person using a separate lamp or a hand signal. This is inconvenient. In contrast thereto, in accordance with the present disclosure, the indicator 10 is installed on the front face FS of the camera lens assembly 100 itself, such that the imaging target person may immediately grasp the current imaging state via the indicator. The indicator 10 may be implemented as a figure-shaped lamp (e.g., a circular, oval, square shaped lamp, etc.) or a letter-shaped lamp (e.g., "REC"), and may display different colors depending on the imaging state.

Referring to FIG. 2C, in one embodiment of the present disclosure, the indicator 10 and the second electric connector 109-2 may be positioned on the front face FS of the camera lens assembly 100 and in a portion of a circumferential area where the plurality of bayonet claws 40 are not formed. Further, while being disposed on the front face FS of the camera lens assembly 100, the indicator 10 and the second electric connector 109-2 may be positioned in an opposite manner to each other in the circumferential direction. Preferably, the indicator 10 may be positioned on an upper area of the front face FS of the camera lens assembly 100, while the second electric connector 109-2 may be positioned on a lower area of the front face FS of the camera lens assembly 100.

Due to the above-described arrangement of the indicator 10 and the electric connector 109-2, the imaging target person may easily recognize the indicator 10 while physical interference may be avoided when the extension adapter is mounted on the camera lens assembly 100.

In one example, not only the indicator 10 may be disposed on the front face FS of the camera lens assembly 100 so that the imaging target person may visually recognize the imaging state, bus also second indicator 15 may be additionally disposed on the barrel 107 so that a person manipulating the camera may visually recognize the imaging state. Except for the arrangement position, a function and an operation of the second indicator 15 may be configured to be the same as those of the indicator 10.

Further, referring to FIG. 2A and FIG. 2B, the barrel 107 of the camera lens assembly 100 may include a switch 30 via which the user selects one of a plurality of functions. The plurality of functions may include, for example, manual focus, auto focus, iris control, and the like. The selection of the switch may allow adaptive control to be performed on the plurality of optical lenses LU, an aperture AU, etc., so that the operation and the function of the camera lens assembly 100 may be changed. This enables one of various functions provided by the camera lens assembly 100 to be selected without using a user interface provided in the camera body 200.

Figure 3A:
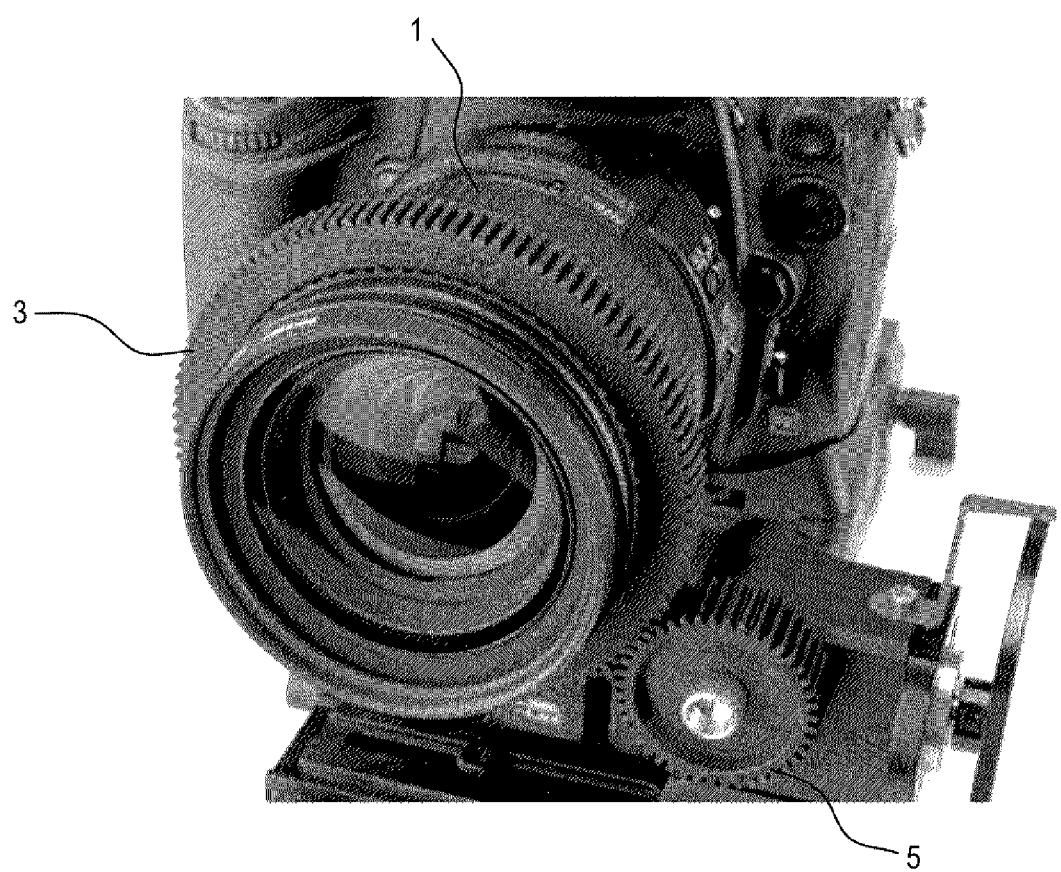
FIG. 3A is a view showing how a manual ring is rotated by a driving gear of a follow focus device in a conventional camera.
Figure 3B:
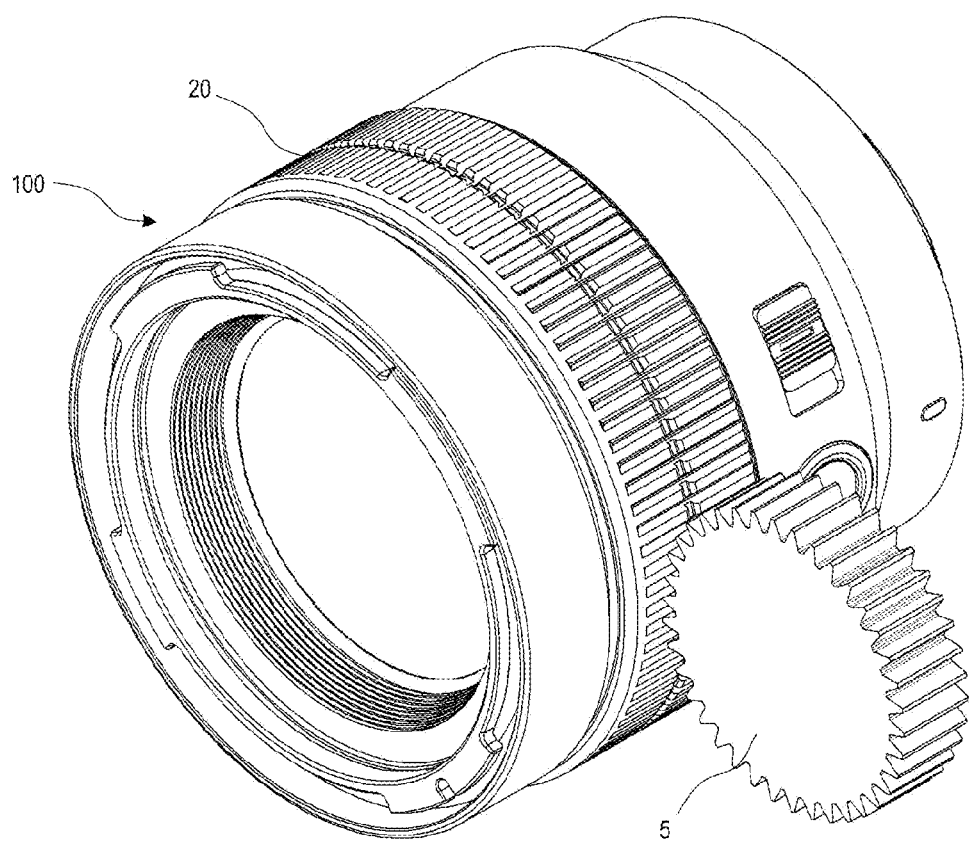
FIG. 3B is a view showing how a manual ring is rotated by a driving gear according to an embodiment of the present disclosure.

FIG. 3A is a view showing how a manual ring 1 is rotated by a driving gear 5 of a follow focus device in a conventional camera. FIG. 3B is a view showing how a manual ring 20 is rotated by the gear 5 according to an embodiment of the present disclosure.

In general, as shown in FIGS. 2A and 2B, the manual ring 20 is an element that the user may manipulate in a rotational manner with respect to the barrel 107. This rotation may allow the zooming lens and/or focusing lens among the plurality of lenses LU to move to manually adjust a focus of the optical system.

However, in order to apply the follow focus function to the conventional manual ring 1, a separate coupling adapter 3 must be installed outside the manual ring 1. This is because, although the conventional manual ring 1 has irregularities formed on an outer face thereof to provide a grip feeling to the user, the conventional manual ring 1 does not have a profile formed such that the conventional manual ring 1 may be directly engaged with the driving gear 5. In this regard, the follow focus is a scheme of adjusting the focus of the optical system by means of a device that rotates the manual ring 1 without user intervention, and is widely used in video imaging such as movie imaging.

In contrast thereto, a gear train having a predetermined gear height Th and a contact face width Tw is formed on a surface of the manual ring 20 installed in the camera lens assembly 100 according to an embodiment of the present disclosure. Accordingly, the manual ring 20 is configured to be directly engaged with the follow focus gear 5.

Figure 4A:
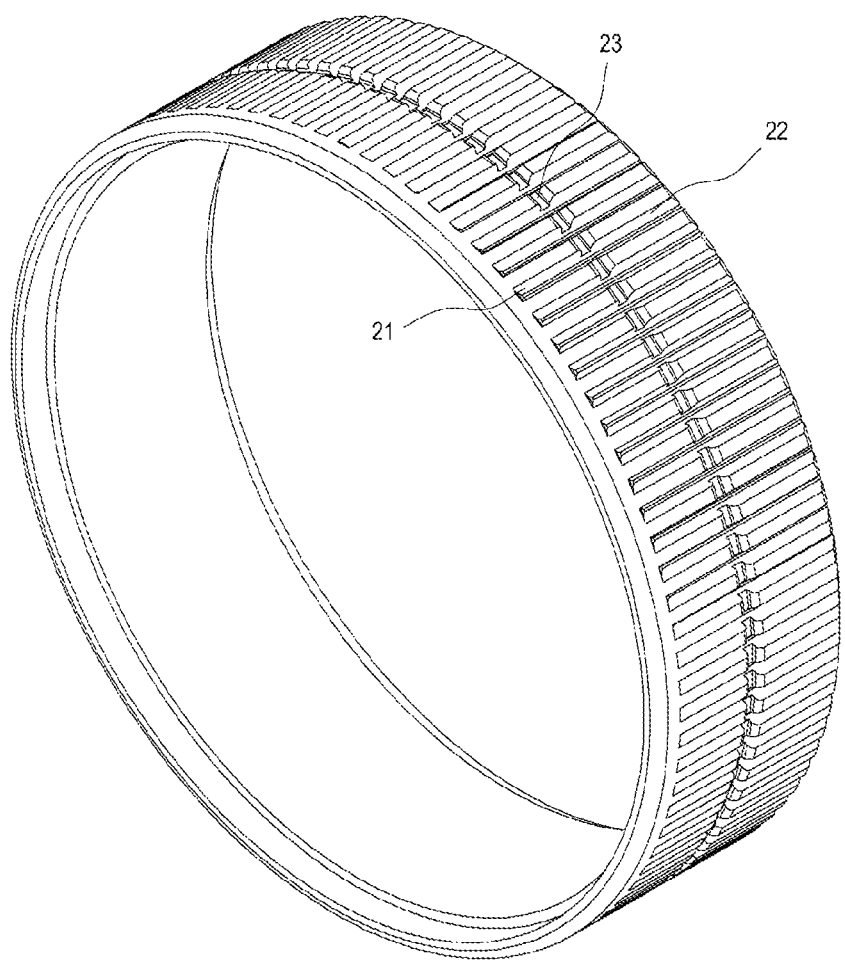
FIG. 4A is a perspective view of a manual ring according to an embodiment of the present disclosure.
Figure 4B:
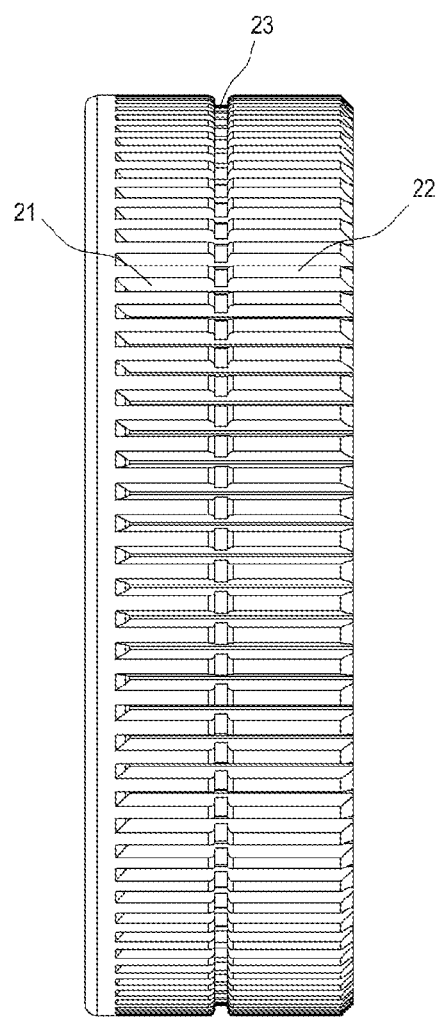
FIG. 4B is a side view of the manual ring.
Figure 4C:
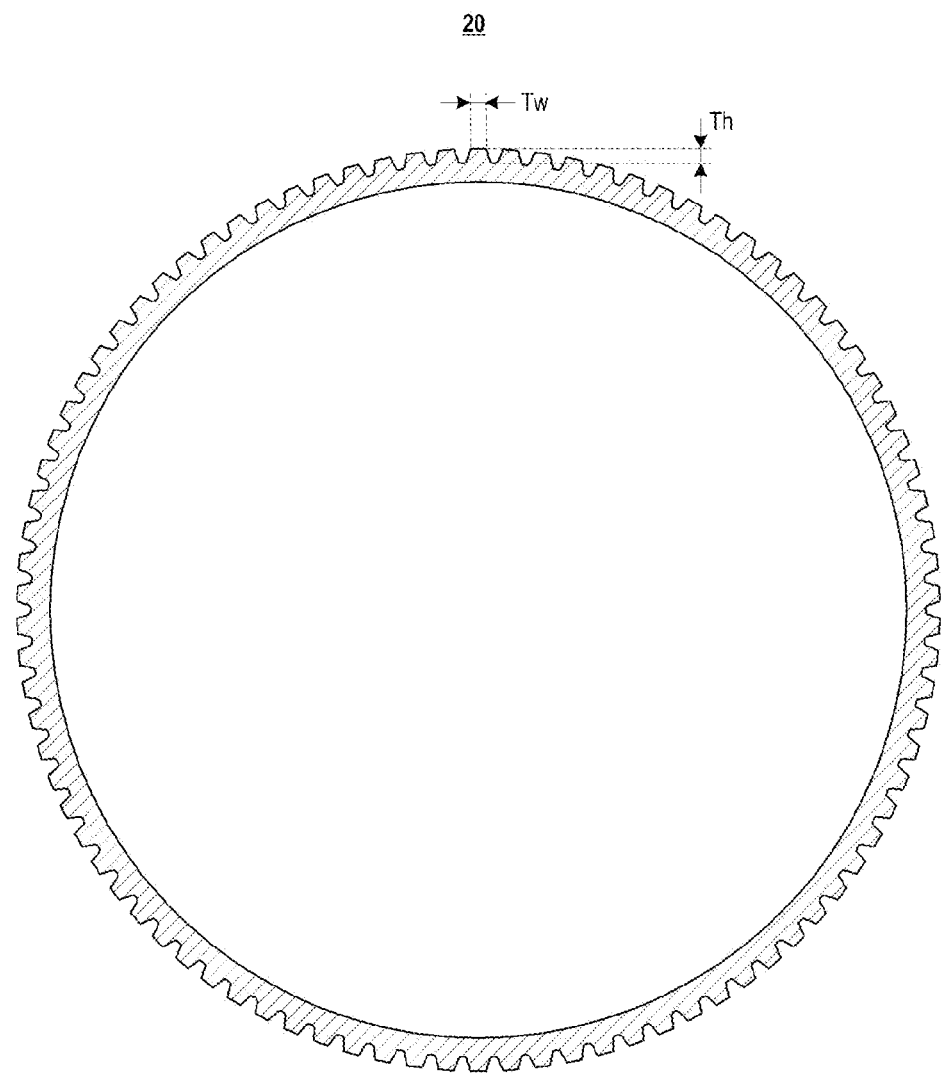
FIG. 4C is a cross-sectional view of the manual ring.

FIG. 4A is a perspective view of the manual ring 20 according to an embodiment of the present disclosure, FIG. 4B is a side view of the manual ring 20, and FIG. 4C is a cross-sectional view of the manual ring 20. As shown in FIG. 4C, the gear train of the manual ring 20 has the predetermined gear height Th and the contact face width Tw. Further, as shown in FIG. 4A and FIG. 4B, the manual ring 20 may additionally have a groove defined therein extending in the circumferential direction so as to partition the gear train.

That is, the gear train may include a first gear train 21 extending in the circumferential direction while having the gear height and the contact face width, and a second gear train 22 spaced apart from the first gear train in an axial direction, and having the gear height and the contact face width, and extending in the circumferential direction. The groove 23 may extend in the circumferential direction so that the first gear train and the second gear train are spaced from each other by a predefined spacing via the groove. The groove 23 contributes to improving the user's griping feeling when the user rotates the manual ring 20, compared to a case in which the groove is absent.

In this regard, an important point is to determine the dimensions of the gear height Th and the contact face width Tw sized such that the manual ring 20 properly engages with the driving gear 5 of the follow focus device and the user's manipulating feeling is not lowered. Accordingly, according to the present disclosure, while the gear height Th and the contact face width Tw has been changed, the coupling state thereof with the driving gear 5 and the manipulating feeling have been evaluated as follows. An evaluation result is summarized in Table 1 below.

TABLE 1

| Examples | Gear height (Th) | Contact face width (Tw) | Coupling state with driving gear | Manipulating feeling |
| --- | --- | --- | --- | --- |
| Example 1 | 1.7 mm | 0.8 mm | Good | Moderate |
| Example 2 | 1.0 mm | 1.4 mm | Good | Excellent |
| Example 3 | 0.8 mm | 1.6 mm | Moderate | Very excellent |

Referring to Table 1 above, it may be preferable that the gear train formed on the manual ring 20 has the gear height in a range of 0.8 mm to 1.7 mm, and the contact face width in a range of 0.8 mm to 1.6 mm. Further, referring to Table 1, it may be identified that the larger the gear height Th and the smaller the contact face width Tw, the better the coupling state with the driving gear but the worse the manipulating feeling, whereas the smaller the gear height Th and the larger the contact face width Tw, the worse the coupling state with the driving gear but the better the manipulating feeling. That is, there is a trade-off between the two factors, that is, the coupling state with the driving gear and the manipulating feeling. Roughly, however, it may be identified that when a sum of the height of the gear and the width of the contact face falls within a range of 2.4 mm to 2.5 mm, the above two factors are substantially satisfied.

Figure 5:
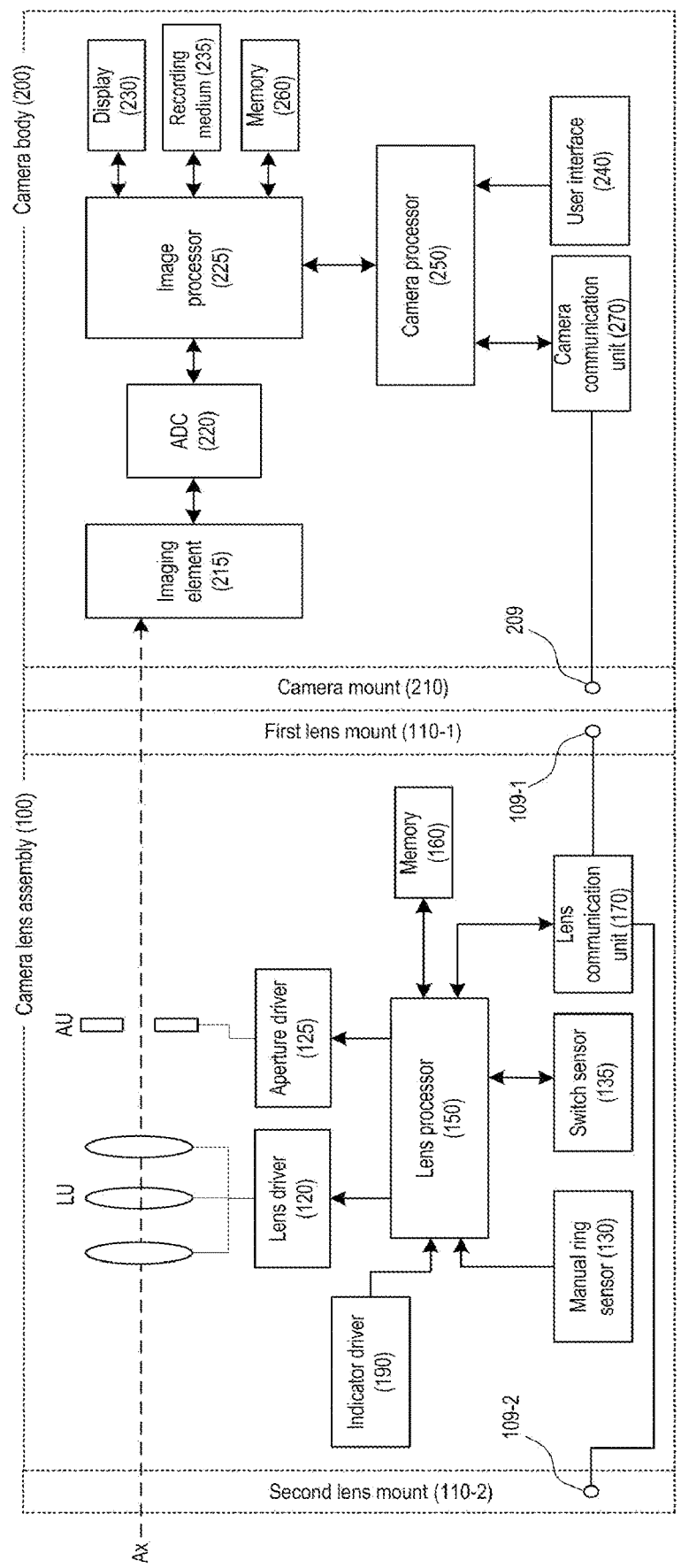
FIG. 5 is a block diagram showing an internal configuration of each of a camera lens assembly and a camera body according to an embodiment of the present disclosure.

FIG. 5 is a block diagram showing an internal configuration of each of the camera lens assembly 100 and the camera body 200 according to an embodiment of the present disclosure.

The camera body 200 includes the camera mount 210 coupled to the first lens mount 110-1 of the camera lens assembly 100 and the camera housing 203 receiving therein the multiple components such as an imaging element 215.

The camera body 200 may include the imaging element 215 which is composed of CCD (Charge Coupled Device) or CMOS (Complementary Metal-Oxide Semiconductor) and which converts light information of a subject obtained via the camera lens assembly 100 into an electrical signal. The optical information of the subject obtained from the imaging element 215 is transmitted to an image processor 225 via an analog-digital converter (ADC) 220 that converts an analog electrical signal into a digital signal. The image processor 225 performs various image processing on the digital signal to generate an image signal, and displays the image signal (still image or moving image) on a display 230 or records the same into a recording medium 235. Further, a memory 260 functions as a buffer when the image signal is processed.

Further, the camera body 200 further includes a camera communication unit 270 communicating with a lens communication unit 170 of the camera lens assembly 100, and a camera processor 250 as a CPU for controlling the camera communication unit 270, the imaging element 215, the image processor 225, and a user interface 240. A user may transmit various commands to the camera processor 250 via the user interface 240.

In one example, the camera lens assembly 100 includes the lens barrel 107 and the first lens mount 110-1. Electrical communication between the camera lens assembly 100 and the camera body 200 may be carried out between the lens communication unit 170 having the plurality of electric connectors 109 and the camera communication unit 270 having the plurality of electric connectors 209 as respectively and electrically connectable to each other. Accordingly, various types of information such as power supply or control information may be exchanged between the camera processor 250 and a lens processor 150.

In addition to the first lens mount 110-1, the camera lens assembly 100 may further include the optical lenses LU including a zooming lens that moves during zooming, a focusing lens that moves during focusing, and a fixed lens that performs basic optical functions, and the aperture unit AU.

The camera lens assembly 100 further includes the lens driver 120 for driving the zooming lens or focusing lens and an aperture driver 125 for driving the aperture unit AU.

The camera lens assembly 100 further includes the lens communication unit 170 for communicating with the camera body 200 and the extension adapter in a bi-directional manner, the lens processor 150 as a CPU for controlling the communication unit 170, a memory 160 as a buffer for temporarily storing therein information processed by the lens processor 150. The lens processor 150 also controls a manual ring sensor 130, a switch sensor 135, and the lens communication unit 170.

As described above, the user may select one of the plurality of functions supported by the camera lens assembly 100 using the switch 30. When the user manipulates the switch 30 for the selection, the switch sensor 135 detects a current function of the switch 30 selected by the user. The plurality of functions may include manual focus, auto focus, iris control, and the like.

Further, the user may adjust the focus of the optical system by rotating the manual ring 20 provided outside the camera lens assembly 100. The lens processor 150 transmits a driving signal corresponding to the detected manipulation of the manual ring 20 to the lens driver 120. Based on the transmitted driving signal, the lens driver 120 controls the movement of the optical lens so as to correspond to a manipulation value of the manual ring 20.

An indicator driver 190 drives the indicators 10 and 15 so that the indicator 10 installed on the front face FS of the camera lens assembly 100 and the indicator 15 installed on the barrel 107 may emit light of a specific color to indicate the imaging state. The color may correspond to various imaging states such as power ON, imaging in progress, and the standby mode.

Figure 6:
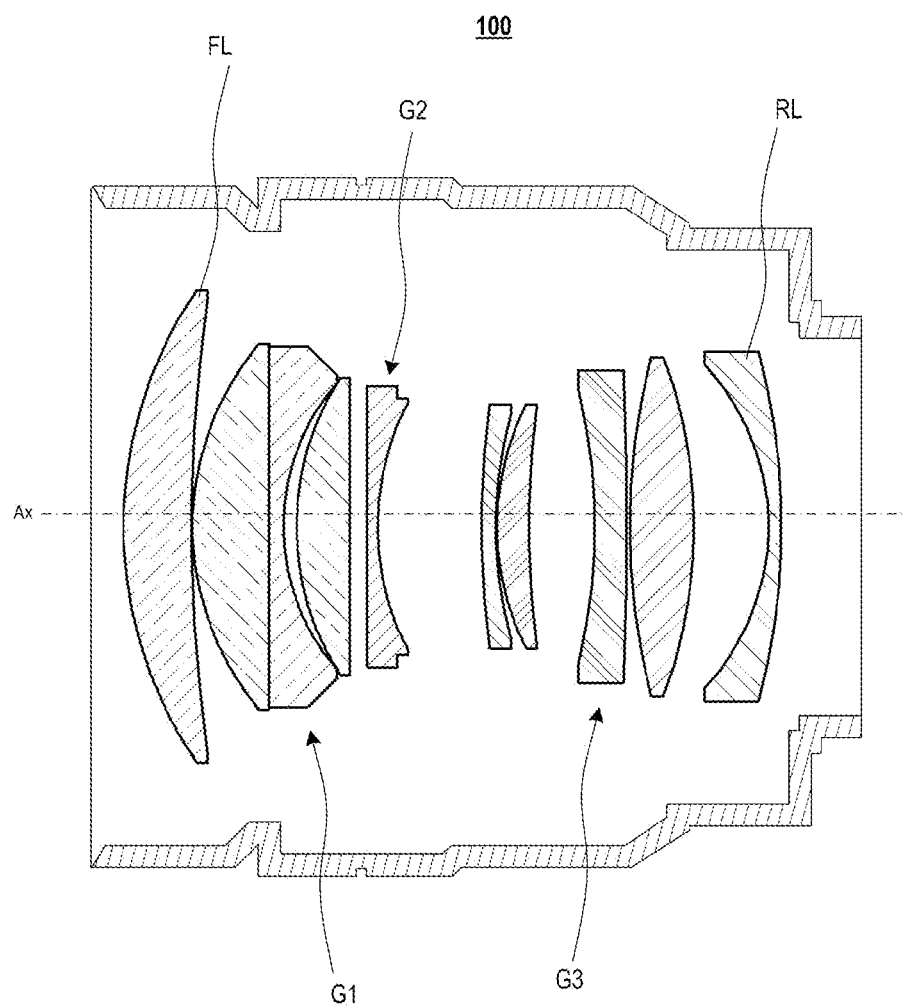
FIG. 6 is a longitudinal cross-sectional view of a camera lens assembly according to an embodiment of the present disclosure.

FIG. 6 is a longitudinal cross-sectional view of the camera lens assembly 100 according to an embodiment of the present disclosure. Referring to FIG. 6, inside the camera lens assembly 100, a number of optical lenses including the first lens FL to the last lens RL are arranged along an optical axis Ax.

The plurality of optical lenses may be classified into a plurality of groups G1, G2, and G3 according to optical functions thereof. The second group G2 may be a focusing lens group composed of a single lens. The first group G1 and the third group G3 are fixed. The focusing is performed by moving only the second group G2 composed of a focusing lens. Thus, an entire length of the optical system may be fixed regardless of the focusing, thereby reducing a size of the camera lens assembly 100.

Each component described above with reference to FIG. 5 may be implemented as a software component, such as a task performed in a predetermined region of a memory, a class, a subroutine, a process, an object, an execution thread or a program, or a hardware component, such as a Field Programmable Gate Array (FPGA) or Application Specific Integrated Circuit (ASIC). In addition, the components may be composed of a combination of the software and hardware components. The components may be reside on a computer readable storage medium or may be distributed over a plurality of computers.

And each block may represent a module, segment, or portion of code, which comprises one or more executable instructions for implementing specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

Although embodiments of the present disclosure have been described with reference to the accompanying drawings, the present disclosure is not limited to the above embodiments, but may be implemented in various different forms. A person skilled in the art may appreciate that the present disclosure may be practiced in other concrete forms without changing the technical spirit or essential characteristics of the present disclosure. Therefore, it should be appreciated that the embodiments as described above is not restrictive but illustrative in all respects.

What is claimed is:

1. A camera lens assembly capable of communicating with a camera body and having a processor and a memory disposed therein, the camera lens assembly comprising:
 a plurality of optical lenses accommodated in the camera lens assembly;

a first lens mount for detachably mounting the camera lens assembly to the camera body;

a first electric connector formed on a rear face of the camera lens assembly, wherein the first electric connector is electrically coupled to the camera body when the camera lens assembly is mounted on the camera body;

a lens communication unit connected to the first electric connector so as to transmit and receive an electrical signal between the camera lens assembly and the camera body;

a lens driver for controlling a displacement of each of the plurality of optical lenses based on the electrical signal received from the camera body; and an indicator for visually presenting an imaging state of the camera body, based on the received electrical signal, wherein the indicator is installed on a front face of the camera lens assembly so that an imaging target person imaged by the camera body can visually recognize the imaging state of the camera body.

2. The camera lens assembly of claim 1, wherein the indicator is implemented as a figure-shaped lamp or a character-shaped lamp, wherein the imaging state indicates that the camera body is imaging the imaging target person.

3. The camera lens assembly of claim 1, further comprising:

a second lens mount formed on the front face of the camera lens assembly, wherein the second lens mount is configured for detachably attaching an extension adapter extending an optical function of the camera lens assembly to the camera lens assembly; and a second electric connector formed on the front face of the camera lens assembly, wherein the second electric connector is electrically coupled to the extension adapter when the extension adapter is mounted on the camera lens assembly, wherein the lens communication unit is connected to the second electric connector so as to transmit and receive an electrical signal between the extension adapter and the camera lens assembly.

4. The camera lens assembly of claim 3, wherein the indicator and the second electric connector are respectively positioned on opposite sides to each other of a circumferential area of the front face of the camera lens assembly.

5. The camera lens assembly of claim 4, wherein the indicator is positioned on an upper side of the front face of the camera lens assembly, and the second electric connector is positioned on a lower side of the front face of the camera lens assembly.

6. The camera lens assembly of claim 3, wherein the second lens mount includes a plurality of bayonet claws, wherein each of the indicator and the second electric connector is positioned on a portion of a circumferential area of the front face of the camera lens assembly in which the plurality of bayonet claws are absent.

7. The camera lens assembly of claim 1, further comprising a switch for receiving a selected one of a plurality of functions provided by the camera lens assembly from a user, wherein the lens driver controls a displacement of at least one of the plurality of optical lenses disposed in the camera lens assembly based on a mode indicated by the switch.

8. The camera lens assembly of claim 1, further comprising a second indicator installed on a barrel of the camera lens assembly so that a person manipulating the camera body can visually recognize the imaging state of the camera body via the second indicator.

* * * * *